(12) United States Patent
Meng et al.

(10) Patent No.: US 11,956,330 B2
(45) Date of Patent: Apr. 9, 2024

(54) ADAPTIVE DATA FETCHING FROM NETWORK STORAGE

(71) Applicant: International Business Machines Corporation, Armonk, NY (US)

(72) Inventors: Xiaoqiao Meng, Millwood, NY (US); Wei Tan, Elmsford, NY (US); Guohui Wang, Elmsford, NY (US); Zhe Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 17/138,456

(22) Filed: Dec. 30, 2020

(65) Prior Publication Data

US 2021/0120092 A1 Apr. 22, 2021

Related U.S. Application Data

(62) Division of application No. 14/144,894, filed on Dec. 31, 2013, now Pat. No. 10,931,776.

(51) Int. Cl.
*H04L 67/5651* (2022.01)
*H04L 67/1097* (2022.01)

(52) U.S. Cl.
CPC ...... *H04L 67/5651* (2022.05); *H04L 67/1097* (2013.01)

(58) Field of Classification Search
None
See application file for complete search history.

(56) References Cited

U.S. PATENT DOCUMENTS 6,405,034 B1   6/2002   Tijerino
6,560,631 B1   5/2003   Ishihara et al.
(Continued)

FOREIGN PATENT DOCUMENTS

CN   102148870   8/2011
EP   2400720 A1 * 12/2011   ....... G06F 17/30867
(Continued)

OTHER PUBLICATIONS

Combined Search Report under Section 17(5)(b) and abbreviated Examination Report under Section 18(3) issued in U.K. patent application No. GB1422580.9.

*Primary Examiner* — Augustine K. Obisesan
(74) *Attorney, Agent, or Firm* — Scully, Scott, Murphy & Presser, P.C.; Caleb Wilkes

(57) ABSTRACT

Methods, systems and computer program products for data fetching in a networked computing environment. In one embodiment, the method comprises receiving a request from an analytical node for a set of data for a defined job, and identifying in networked storage a subset of the data for the job. The subset of data is loaded to the analytical node based on the sequence in which the data are projected to be accessed in the job. In an embodiment, the request includes a specification for the job, and the specification is analyzed to identify the subset of data. In one embodiment, the subset of data is identified by identifying another job having a relationship to the defined job, and identifying the data used for that other job. In an embodiment, the networked computing environment is a cloud computing environment, and the defined job is an analytics job.

13 Claims, 7 Drawing Sheets

(56) References Cited

U.S. PATENT DOCUMENTS

| | | | |
|---|---|---|---|
| 7,958,511 B1* | 6/2011 | Pomerantsev | G06F 9/5027 |
| | | | 718/104 |
| 8,150,889 B1 | 4/2012 | Bachavachalu et al. | |
| 8,539,163 B1* | 9/2013 | Sivasubramanian | |
| | | | G06F 9/3863 |
| | | | 711/204 |
| 8,769,573 B2 | 7/2014 | Jin et al. | |
| 8,849,764 B1 | 9/2014 | Long et al. | |
| 2002/0040639 A1 | 4/2002 | Duddleson et al. | |
| 2003/0163673 A1 | 8/2003 | Yeluri | |
| 2003/0187984 A1* | 10/2003 | Banavar | H04L 67/53 |
| | | | 709/225 |
| 2007/0150449 A1 | 5/2007 | Suganuma et al. | |
| 2008/0027920 A1 | 1/2008 | Schipunov et al. | |
| 2008/0174426 A1 | 7/2008 | Hackworth et al. | |
| 2008/0240566 A1 | 10/2008 | Thint | |
| 2010/0241789 A1 | 9/2010 | Chu et al. | |
| 2011/0231457 A1* | 9/2011 | Tager | G06F 16/217 |
| | | | 707/825 |
| 2011/0246722 A1* | 10/2011 | Taha | G06F 12/0862 |
| | | | 711/137 |
| 2011/0302226 A1 | 12/2011 | Abadi et al. | |
| 2012/0089781 A1 | 4/2012 | Ranade et al. | |
| 2012/0102053 A1 | 4/2012 | Barrett et al. | |
| 2012/0323884 A1* | 12/2012 | Draese | G06F 16/245 |
| | | | 707/E17.017 |
| 2012/0331050 A1 | 12/2012 | Wilbur et al. | |
| 2013/0013745 A1 | 1/2013 | Whittick et al. | |
| 2013/0117240 A1 | 5/2013 | Taylor et al. | |
| 2013/0132967 A1 | 5/2013 | Soundararajan et al. | |
| 2013/0152088 A1 | 6/2013 | Gkantsidis et al. | |
| 2013/0262556 A1 | 10/2013 | Xu et al. | |
| 2013/0282906 A1 | 10/2013 | An et al. | |
| 2013/0339605 A1 | 12/2013 | Factor et al. | |
| 2014/0012870 A1 | 1/2014 | Wark | |
| 2014/0040575 A1 | 2/2014 | Horn | |
| 2014/0068621 A1 | 3/2014 | Sitaraman et al. | |
| 2014/0136555 A1 | 5/2014 | Jacob et al. | |
| 2014/0201351 A1* | 7/2014 | Fransen | H04L 67/535 |
| | | | 709/224 |
| 2014/0379840 A1* | 12/2014 | Dao | H04L 67/5681 |
| | | | 709/219 |
| 2015/0269233 A1 | 9/2015 | Romainczyk et al. | |

FOREIGN PATENT DOCUMENTS

| | | |
|---|---|---|
| WO | WO2010006132 A2 | 1/2010 |
| WO | WO2020006132 A2 | 1/2010 |
| WO | WO2011153239 A2 | 12/2011 |

* cited by examiner

ADAPTIVE DATA FETCHING FROM NETWORK STORAGE

CROSS-REFERENCE TO RELATED APPLICATION

This application is a divisional application of copending U.S. patent application Ser. No. 14/144,894, filed Dec. 31, 2013, the entire contents and disclosure of which are hereby incorporated herein by reference.

BACKGROUND

This invention generally relates to adaptive data fetching from networked storage. Embodiments of the invention are well suited for adaptive data fetching for analytical workloads in a distributed computing environment such as a cloud computing environment.

Many companies and other entities are using analytics to assist decision-making for improved performance. Analytics, generally, is identifying meaningful patterns in data. These patterns can then be used in descriptive and predictive models. Analytics may be used, for example, for enterprise decision management, retail analytics, store assortment, inventory optimization, sales force sizing, price and promotion modeling, and fraud detection and prevention.

Analytics can require extensive computation and amounts of data. Due to these very heavy resource and data requirements, analytics are often performed using networked computing, which offers significant computing and data storage capabilities.

One type of networked computing that provides a large array of resources is referred to as cloud computing. Cloud computing refers to a set of hosted resources such as processors, operating systems, software, memory and other components that are made available to users over the Internet or some other network. Using cloud computing, a user or customer can request the instantiation of a virtual machine or set of machines from those resources from a central server or management system to perform intended tasks or applications.

A paradigm shift from client-server to cloud computing has occurred in the last decade. This shift is expected to continue, as cloud computing has become pragmatic and more affordable to many customers and clients.

Performing analytics using cloud computing has become very popular for a number of reasons. A user is able to leverage the very large computation and storage resources on the cloud, in an on-demand manner. Also, cloud computing provides a seamless integration of storage and computation clusters in the cloud.

BRIEF SUMMARY

Embodiments of the invention provide adaptive data fetching from networked storage in a networked computing environment. In one embodiment, the method comprises receiving a request from an analytical node for a set of data for performing a defined job; and identifying in the networked storage a subset of the set of data for performing the defined job, said subset of the data being less than the set of data. The subset of the data is loaded to the analytical node in response to the request in an order based on the sequence in which the subset of the data are projected to be accessed in the defined job.

In an embodiment, the request includes a specification for the defined job, and the specification is analyzed to identify the subset of the data for performing the defined job.

In one embodiment, the subset of the data is identified by identifying another job having a specified relationship to said defined job, and identifying data used for said another job. This data used for the said another job are loaded in the response.

In an embodiment, the request is for one or more tables, each of which includes a plurality of blocks of data, and the subset of data are identified by identifying selected blocks of the tables. These selected blocks of the tables are loaded in the response.

In one embodiment, the subset of the data blocks are loaded in the response in the order in which the subset of the data blocks are projected to be accessed in the defined job.

In an embodiment, the subset of the set of data is identified by analyzing patterns of past use of the data in the networked storage.

In one embodiment, a storage of data usage patterns and defined similarity detection metrics is maintained, and these stored data usage patterns and defined similarity detection metrics are used to identify said subset of the data. The storage of data usage patterns and defined similarity detection metrics is updated at specified times.

In an embodiment, the subset of the data is identified by making a prediction of data needed for the defined job, and using this prediction to identify the subset of the set of data.

In one embodiment, the defined job is performed by a set of compute nodes, and the data are stored in a set of storage nodes. Only selected parts of the requested data are loaded in the response to reduce an amount of data transferred between the storage nodes and the compute nodes to perform the defined job.

In an embodiment, the network computing environment is a cloud computing environment, and the defined job is an analytics job.

DETAILED DESCRIPTION

Figure 1:
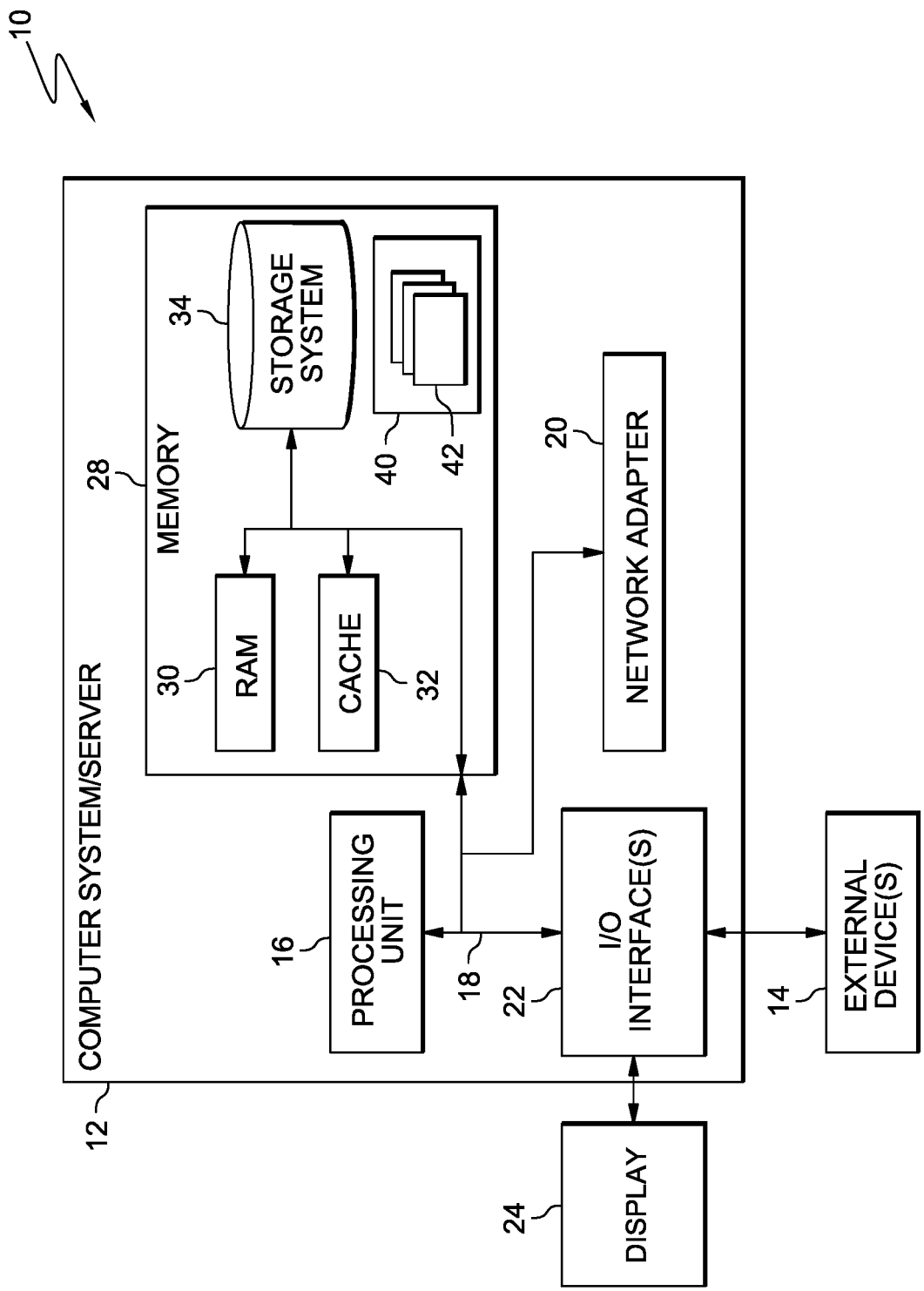
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
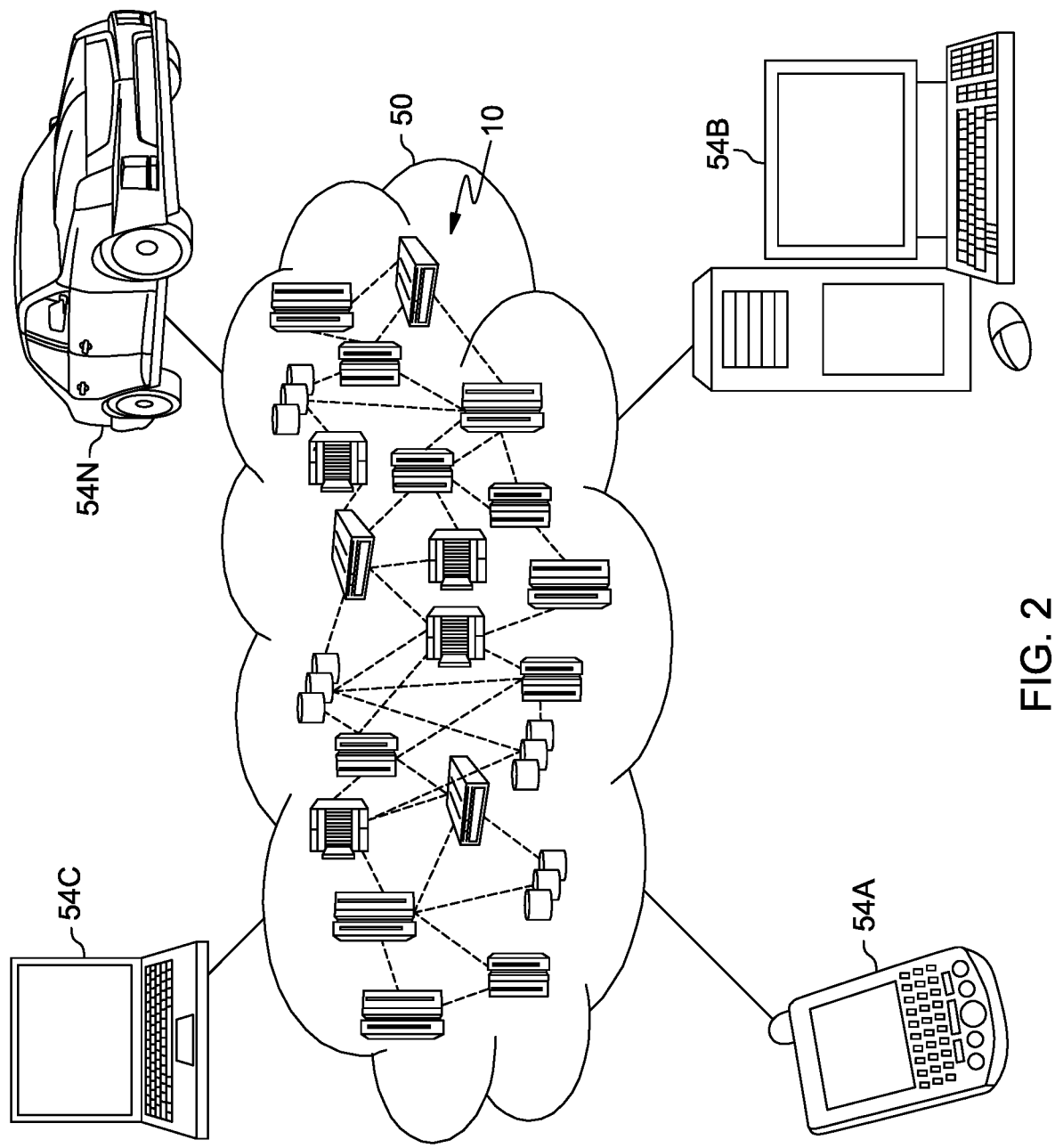
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
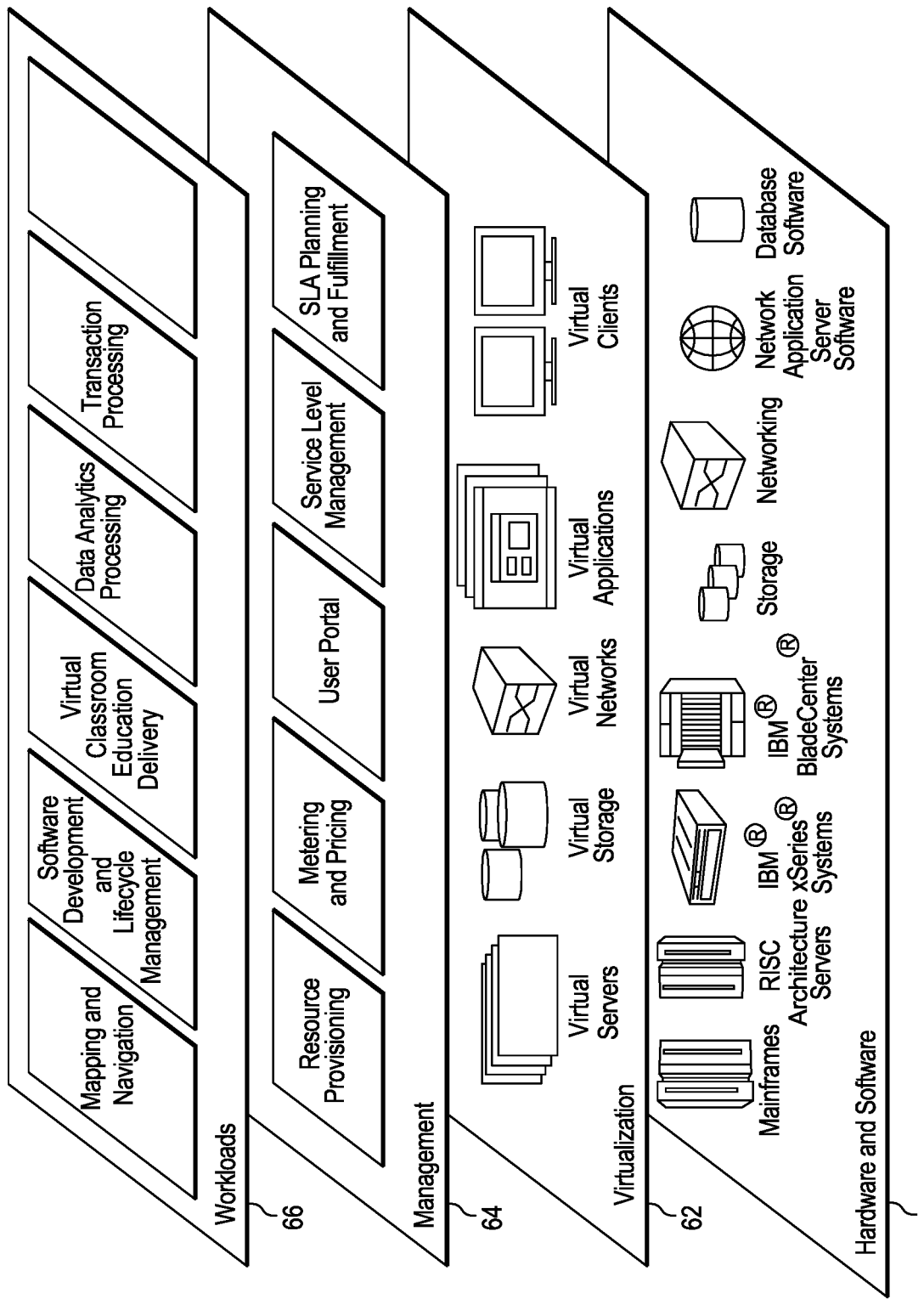
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto.

As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized.

Examples of workloads and functions which may be provided from this layer include: mapping and navigation; software development and lifecycle management; virtual classroom education delivery; data analytics processing; transaction processing; and allocating resources.

As mentioned above, performing analytics using cloud computing has become very popular for a number of reasons. A user is able to leverage the very large computation and storage resources on the cloud, in an on-demand manner. Also, cloud computing provides a seamless integration of storage and computation clusters in the cloud. Cloud storage and the transfer of data in and out of the cloud are not free, however. Technology to avoid redundant data loading is important to help achieve the economy of using the cloud.

Embodiments of the invention provide adaptive data fetching from network storage in a network computing environment. In one embodiment, the method comprises receiving a request for a set of data for performing a defined job; and identifying in the network storage a subset of the set of data for performing the defined job, said subset of the data being less than the set of data. The subset of the data is loaded in a response to the request in an order based on which the subset of the data are projected to be accessed in the defined job.

In an embodiment, the request includes a specification for the defined job, and the specification is analyzed to identify the subset of the data for performing the defined job. In one embodiment, the subset of the data is identified by identifying another job having a specified relationship to said defined job, and identifying data used for said another job. This data used for the another job are loaded in the response.

Embodiments of the invention may be used in or with a wide range of specific applications. For example, embodiments of the invention may be used in or with performing analytics.

Analytics, or business data analysis, provide a company making a decision with an opportunity to improve performance by providing the best possible information relevant to the decision to drive a high performance outcome. An analytics system may provide a variety of descriptive and/or predictive analytics for multiple clients based on the dynamic needs of the clients.

Descriptive analytics may comprise analyzing historic data, which may include performance data, to provide a description of what happened for past events. Descriptive analytics may encompass identifying successes or failures, which may be based on key performance indicators for a given application. Descriptive analytics may include generating alerts, queries, ad hoc reports, standard reports, etc. that provide data and insight into a current issue surrounding a crucial decision. Predictive analytics may comprise estimating a probable future outcome of an event or a probability or likelihood of an event occurring given a set of circumstances. A predictive analytics engine may perform optimization, predictive modeling, forecasting/extrapolation, statistical analysis, etc. to predict an outcome. The predictions may be used to drive business decisions or non-business related decisions that may depend on forecasting made available through predictive analytics.

Figure 4:
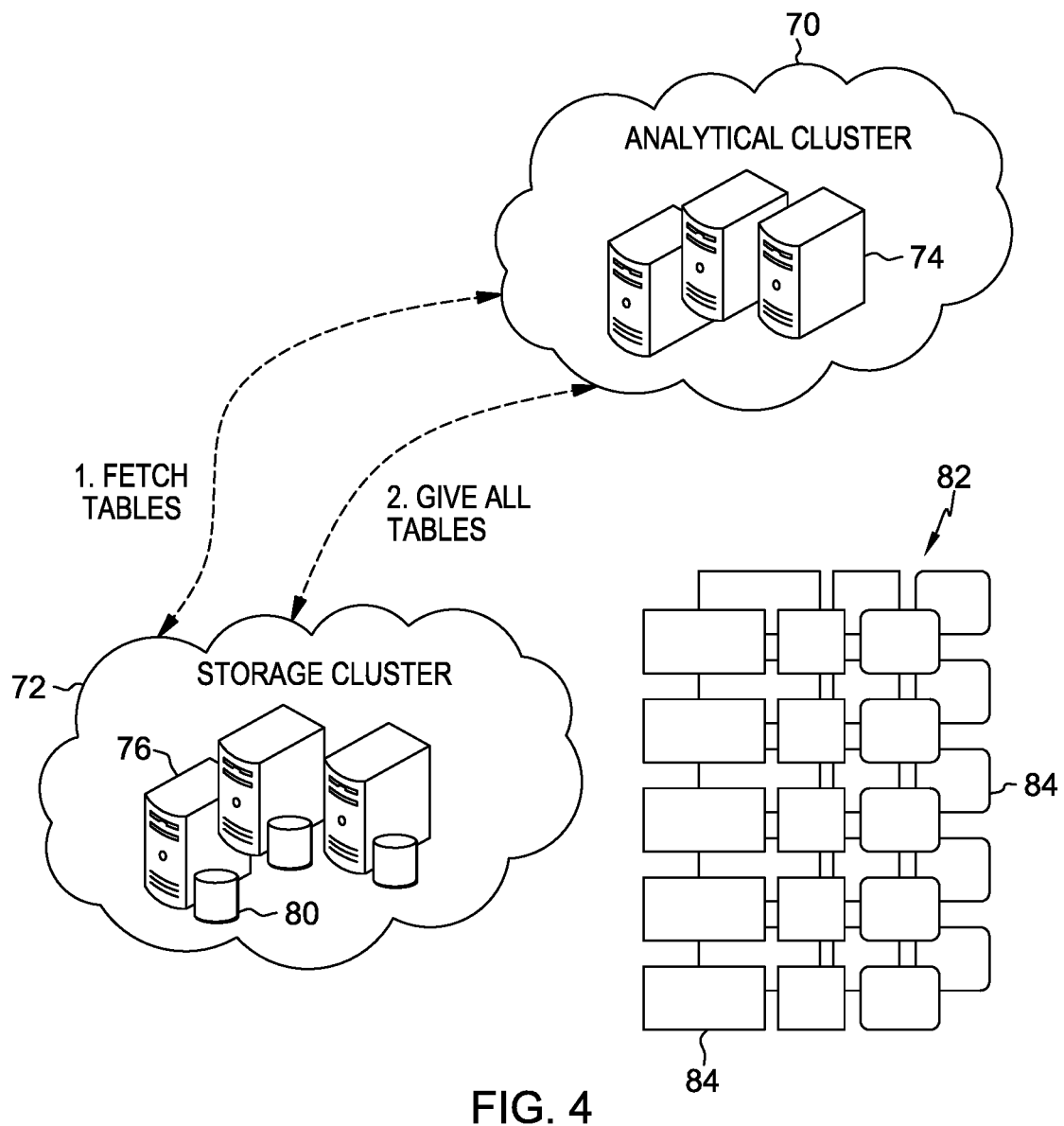
FIG. 4 illustrates a current data fetching approach in which tables are fetched as a whole.

Analytics need to load data from storage, and FIG. 4 illustrates a current approach to fetch tables from storage. FIG. 4 illustrates an analytical cluster 70 and a storage cluster 72; and the analytical cluster includes a group of servers 74, and the storage cluster includes a group of servers 76 and data storage devices 80. FIG. 4 also shows a data table 82 that is comprised of a number of blocks 84 of data. Persisted data are stored in the storage cluster, e.g. Amazon S3, OpenStack Swift. Tables are horizontally partitioned based on a key range; and the tables are vertically partitioned, i.e., each column of a table is stored in a separate file. Databases or data stores that support this type of horizontal and vertical partitioning include HBase, Cassandra, and Hive RCFile.

The analytics run in the analytical cluster 70, e.g., Amazon EMR. The current approach is to load all blocks of a table from cloud storage and then run analytics. This current approach is to fetch tables as a whole. This consumes disk and network bandwidth, and consumes disk space in the analytical cluster.

Figure 5:
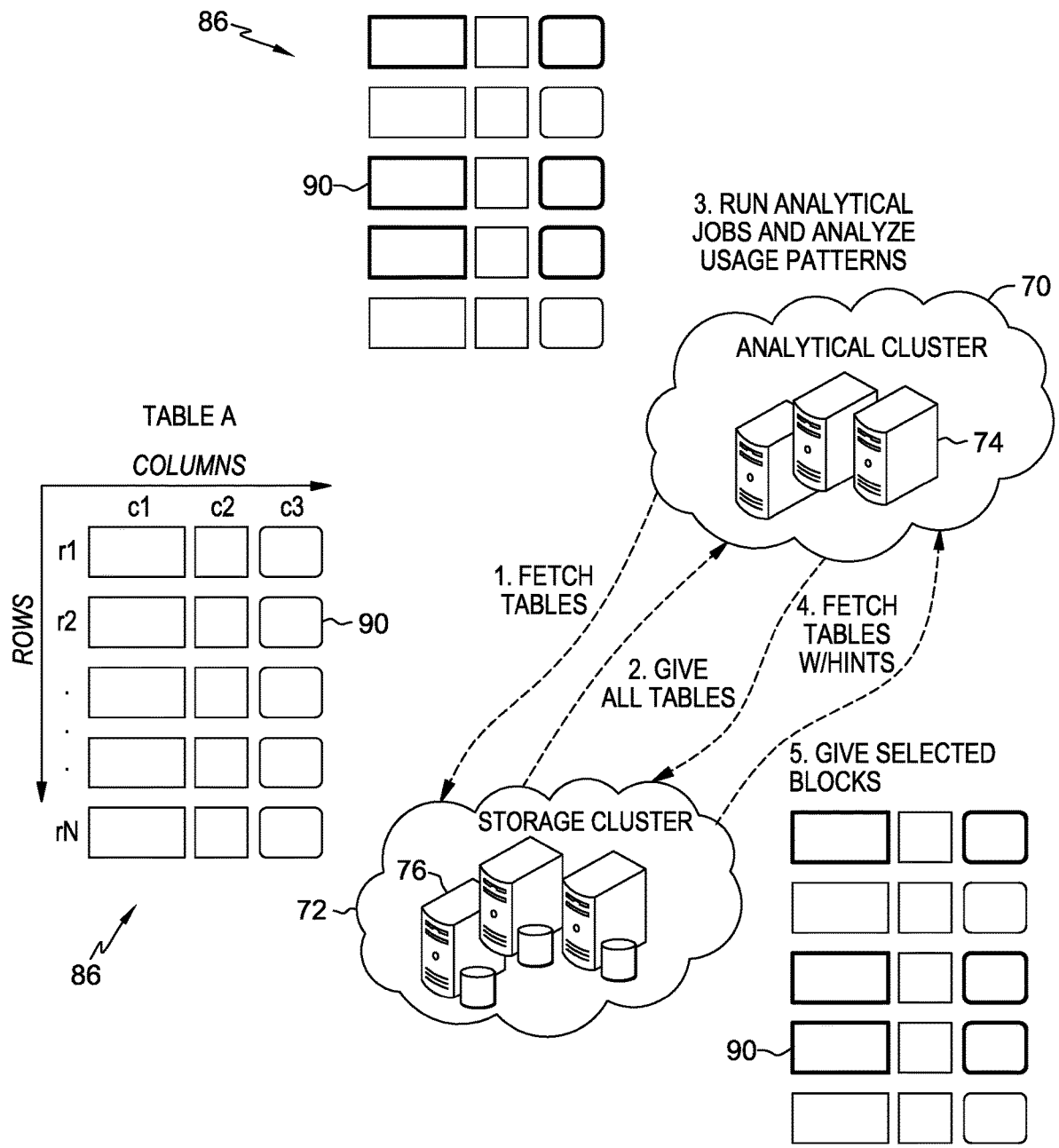
FIG. 5 shows a group of tables and a procedure for fetching data from the tables in accordance with an embodiment of the invention.

FIG. 5 illustrates data fetching in an embodiment of the invention. FIG. 5 shows analytical cluster 70 and storage cluster 72, and FIG. 5 also shows a group of tables 86, each of which is comprised of a number of blocks 90 of data. In this embodiment, the usage patterns of files/blocks fetched from the storage cloud, in analytics jobs, are analyzed. The block fetching logic is optimized. Only the data blocks necessary to answer queries are fetched, and the data blocks are sequentially fetched based on the order of the queries. Other blocks, if needed, are fetched on-demand.

For example, for an analytics job or jobs, the analytical cluster may request a set of tables from the storage cluster, and all the blocks of these tables are given to the analytical cluster. The analytical cluster runs the analytical jobs, and the data usage patterns are analyzed. Then, when the analytical cluster asks for tables from the storage cluster for a subsequent analytics job or jobs, the request include hints, based on the analysis of the earlier job or jobs, about which table blocks to provide. The storage cluster analyzes the request and the hints and gives selected blocks of tables 84 to the analytical cluster.

Figure 6:
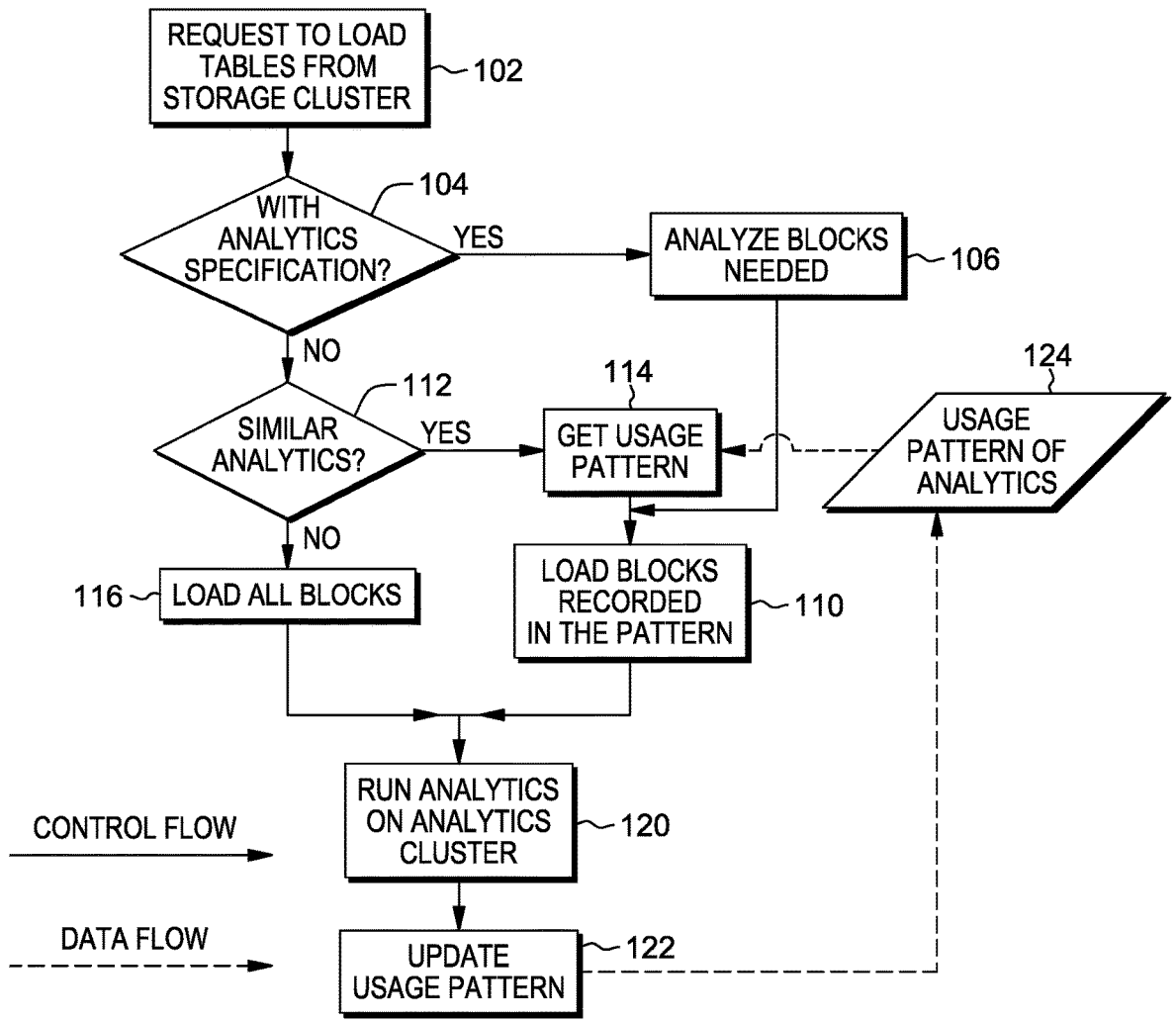
FIG. 6 depicts a procedure for loading data for a batch of analytics jobs in an embodiment of the invention.

FIG. 6 shows the control flow and the data flow in a procedure for a batch of analytics jobs. Block 102 represents a request to load tables from storage cluster 72. Step 104 is to determine whether this request comes with an analytics specification. If the request comes with an analytics specification, the procedure moves to step 106, where the analytics specification is analyzed to determine the table blocks that are needed to respond to the request. The process then goes to step 110 and the needed blocks are loaded in a response and sent to the analytical cluster 70.

If, at 104, it is found that the request does not come with an analytics specification, the procedure goes to step 112. Step 112 is to determine whether there is an analytics similar to the one for which the request was made. Any suitable procedure may be used to make this determination. If a suitable similar analytics is found, then at 114, the usage pattern is obtained; and at step, the blocks recorded in this pattern are loaded and sent to the analytics cluster 70. If, at 112, a similar analytics is not found, then at 116, all the blocks of the requested tables are loaded and sent to the analytics cluster.

From step 110 or step 116, the process continues to step 120. At this step, the analytics are run on the analytics cluster. At step 122, the data usage pattern for the analytics is updated, by monitoring the data access during the actual running of the particular analytics in this particular analytics cluster, and the updated pattern is stored at 124. This updated pattern is then available, if needed, from step 114 of the process.

An analytics specification, which may be an SQL statement, may specify several items. For instance, the specification may ask that blocks be picked from a table (1) based on columns selected, or (2) based on a key range. The specification may ask for (3) the joining of columns that need to be picked, or for (4) the aggregation of columns in group by need to be picked.

As mentioned above, at step 112, any suitable process may be used to make the similarity determination. When no analytics specification is available, a similar analytics can be inferred. A similar analytics may be inferred in terms of, for example, user based, analytics template based, or a combination of multiple criteria.

A user based inference is based on learning a user's data access pattern. This inference is based on the assumption that, multiple analytics done by the same user have similar data access pattern. This may be learned by capturing the correlation between users and stored data. This can be extended to be a temporal model.

An analytics template based reference may use the categories of the analytics. Each analytics can specify the category, e.g., customer behavior analysis, market analysis. This inference is based on the assumption that, multiple analytics belong to the same category have similar data access pattern. Each incoming analytics request is compared with past runs in the same category, and blocks that were frequently used in those past runs are suggested for the current analytics request.

A combination of multiple criteria could also be used to infer similar analytics. A collaborative filtering approach may be used; using frequent set and association rule mining. Factors that might be considered may include the user, time, category, and job name.

Figure 7:
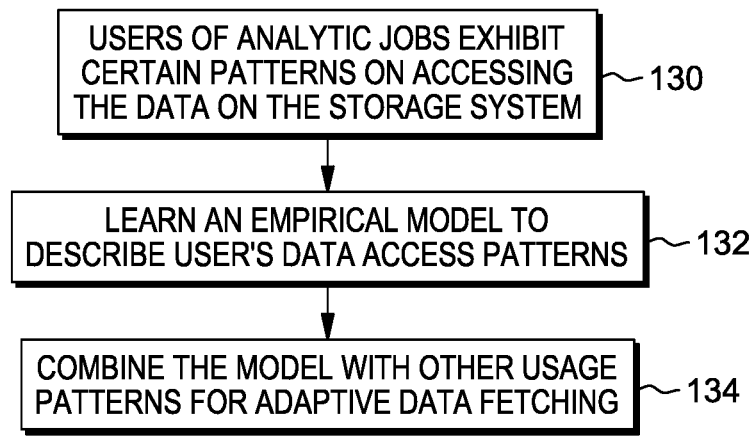
FIG. 7 illustrates adaptive data fetching, in an embodiment of the invention, based on users' data access patterns.

There may be situations where no analytics specification is available or it is impossible or impractical to infer the usage pattern. When this is the case, adaptive data fetching may be done with user's data access pattern. A user's data access pattern may be learned for adaptive data fetching. With reference to FIG. 7, users of analytics jobs, as represented at 130, could exhibit certain patterns on accessing the data in the storage systems; and for example, a user may only access certain rows, or a user may only execute the same analytics operations.

As represented at 132, an empirical model may be learned to describe a user's data access patterns. This may include, for instance, capturing the correlation between users and stored data. This could extend to a temporal model. Also, the learned empirical model could be combined, as represented at 134, with other usage patterns for adaptive data fetching.

A wide range of data may be used in implementations of the invention. For instance, the data may include any data used to provide descriptive and/or predictive analytic solutions to the clients. The data may include publicly available data. For example, the publicly available data stored in the storage device 80 may include market data, news, financials, industry specific data, regulatory changes, weather implications, trends, etc. The data provided by the storage device 80 may also include privately managed data. For example, the privately managed data may include client business process data, customer data, supply chain operations data, enterprise resource planning (ERP) transactions, workforce data, product/service development data, financial data, service provide research data, industry data, etc. The data may also include emerging data. Examples of the emerging data include regional data, eco-political updates, trade/tariff changes, competitor implications, value chain insight (i.e. customer and vendor data), innovation data, pipeline future value data, product development effectiveness data, competitors' innovation progress data, social network outlets, buzz on reputation/brand, etc. Other types of data may also be provided.

The data provided by the storage device 80 may be structured or unstructured data. Unstructured data is computerized information that does not have a well-defined data model or is not usable by a computer program in its current format. For example, the unstructured data may include data from social networks and news blogs, web data, etc. Structured data, on the other hand, either has a well-defined data model (e.g., adheres to a particular schema) or is usable by a computer program in its current format. For example, consumer profiles, consumer addresses, and revenue information may be provided in a predetermined format.

As discussed above, embodiments of the invention may be used to provide data for analytics. The analytics may include creating models from the received data and performing analysis of the data using the models. Examples of the analytics may include segmentation, statistical analysis, forecasting/extrapolation, predictive modeling, optimization and text mining. Segmentation is a method of optimizing performance by determining a specific audience for a business solution and customizing the business solution with the specific audience in mind. The descriptive and/or predictive analytic solutions may be customized for different audiences or populations. Statistical analysis includes summarizing and presenting data, estimation, confidence intervals, hypothesis testing, etc. Forecasting is the process of making statements about events whose actual outcomes have not yet been observed. Extrapolation is the process of constructing new data points outside of a discrete set of known data points. Predictive modeling is a process of creating or choosing a model to predict the probability of an outcome. Optimization is the improvement of a process, product, business solution, etc. Text mining is the process of deriving high-quality information from text.

While it is apparent that embodiments of the invention herein disclosed are well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of adaptive data fetching from networked storage in a networked computing environment, the method comprising:
   receiving, at a network storage system in the network computing environment, a request from an analytical node for a set of data for performing a defined job, the network storage system including a storage cluster of servers and data storage devices;
   analyzing said request to determine whether said request includes a specification of the defined job;
   determining whether another job having a specified relationship to said defined job can be identified;
   when the request does not include a specification of the defined job and no other job having the specified relationship to said defined job is identified, loading the whole requested data from the networked storage in a response to said request for the one analytical node to use said whole requested data to perform the defined job, and
   when the request includes the specification of the defined job or when said other job having the defined relationship with the defined job is identified, using said specification or using said other job having the defined relationship with the defined job to identify in the networked storage a subset of the set of data for performing the defined job, said subset of the data being less than the set of data;

after the identifying the subset of the set of data requested by the one remote analytical node, the network storage system adaptively fetching said subset of the data at the network storage system and transmitting the adaptively fetched subset of the data to the one analytical node; and loading the subset of the data to the analytical node in response to the request in an order based on the sequence in which the subset of the data are projected to be accessed in the defined job, wherein the defined job is an analytics job; and the method further comprises:

storing a data usage pattern for the analytics job, the data usage pattern comprising a pattern of data fetched from the network storage system, said data comprising files and data blocks fetched from data tables stored in the network storage system;

updating the stored data usage pattern for the analytics job by monitoring data access by the remote analytical node during running of the analytics job; and the identifying a subset of the set of data requested by the remote analytical node includes learning an empirical model to describe access patterns of the remote analytical node based on captured correlations between users and stored data, and wherein a subsequent request from the remote analytical node further comprise hints based on an analysis by the remote analytical node of earlier tasks run by the remote analytical node, about which data to send to the remote analytical node, the storage cluster analyzing the request and the hints to determine the subset of data needed to respond to the subsequent request, wherein the request and subsequent analytical cluster request is a request for one or more data tables from the storage cluster of servers, each of the data tables including a plurality of blocks of data, the identifying a subset of the set of data includes identifying selected blocks of the data tables, said method further comprising:

conducting analytics based on an analytics template, said analytics template specifying one or more categories for the analytics, wherein multiple analytics that belong to a same category have similar data access patterns;

comparing the request with past runs in the same category, and suggesting blocks that were frequently used in the past runs for a current analytics request; and the loading the subset of the data includes loading the selected blocks of the data tables in the response.

2. The method according to claim 1, further comprising:
maintaining a storage of data usage patterns and defined similarity detection metrics; and
using said storage of data usage patterns and defined similarity detection metrics to identify in the network storage a subset of the set of data for performing the defined job, said subset of the data being less than the set of data.

3. The method according to claim 2, further comprising:
updating the storage of data usage patterns and defined similarity detection metrics at specified times.

4. The method according to claim 1, wherein the identifying a subset of the set of data includes:
analyzing patterns of past use of the data in the network storage; and
using said analyzing to identify the subset of the set of data.

5. The method according to claim 1, wherein the identifying a subset of the data includes:
making a prediction of data needed for the defined job; and
using said prediction to identify the subset of the set of data.

6. The method according to claim 1, wherein:
the defined job is performed by a set of compute nodes;
the data blocks are stored in a set of storage nodes; and
the loading includes loading only selected parts of the requested data to reduce an amount of data transferred between the storage modes and the compute nodes to perform the defined job.

7. The method according to claim 1, wherein:
the networked computing environment is a cloud computing environment; and
the defined job is an analytics job, the network storage system analyzing the request to determine whether the request includes an analytics specification for the defined job.

8. The method according to claim 1, wherein the adaptively fetching said subset of the data at the network storage system includes fetching only the data necessary to respond to the request.

9. The method according to claim 1, wherein the identifying a subset of the set of data requested by the remote analytical node further includes capturing a correlation between the remote analytical node and data stored in the network storage.

10. The method according to claim 1, wherein a data table is horizontally partitioned based on a key range; and the data tables are vertically partitioned, wherein each column of a table is stored in a separate file.

11. The method according to claim 10, wherein said subsequent analytical cluster request is a request for a set of data tables from the storage cluster of servers, each said table comprising a plurality of blocks, the analytics specification requesting blocks picked from a table based on one or more columns selected.

12. The method according to claim 10, wherein said subsequent analytical cluster request is a request for a set of data tables from the storage cluster of servers, each said data table comprising a plurality of blocks, the analytics specification requesting blocks picked from a data table based on a key range.

13. The method according to claim 10, wherein the analytics specification requesting a joining of columns that need to be picked or for an aggregation of columns in the group that need to be picked.

* * * * *